L. J. SCHMIDT.
STALL GUARD FOR ANIMALS.
APPLICATION FILED JULY 17, 1912.
1,047,994.
Patented Dec. 24, 1912.
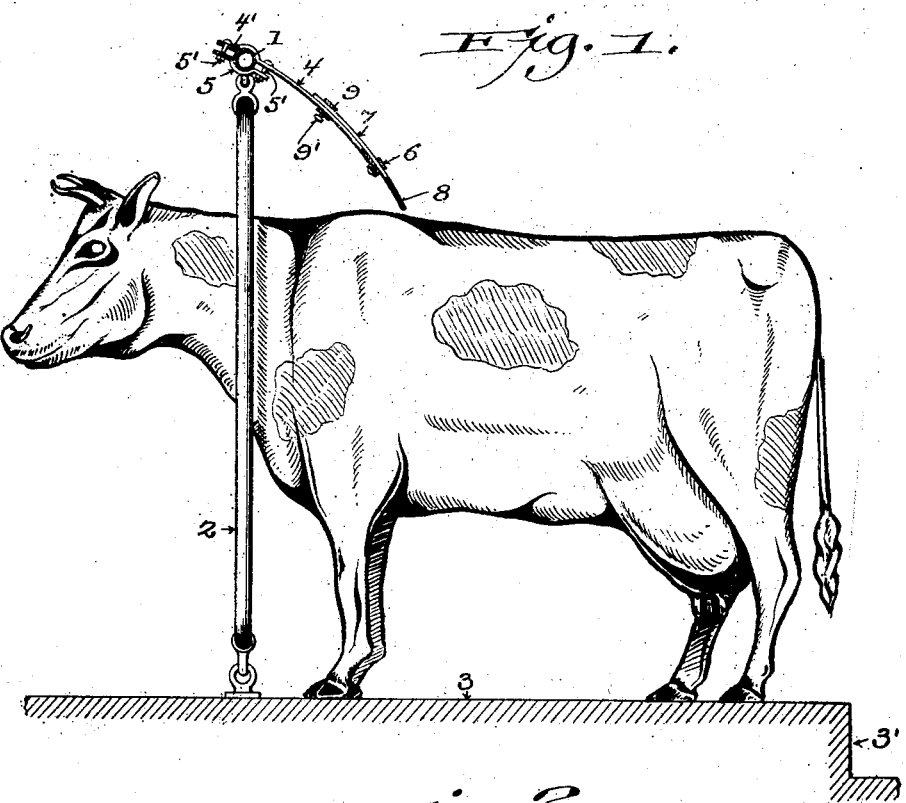
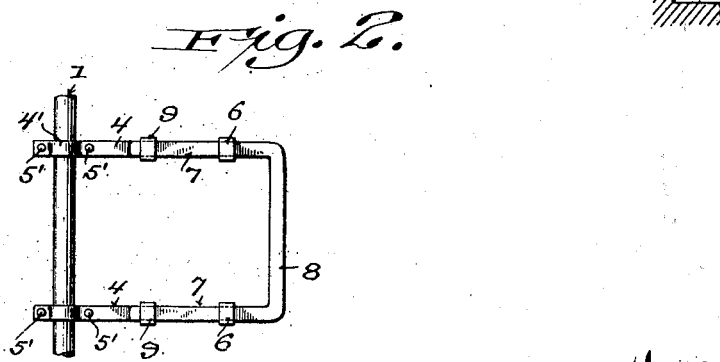

UNITED STATES PATENT OFFICE.

LOUIS J. SCHMIDT, OF TWO RIVERS, WISCONSIN.

STALL-GUARD FOR ANIMALS.

1,047,994. Specification of Letters Patent. Patented Dec. 24, 1912.

Application filed July 17, 1912. Serial No. 709,906.

*To all whom it may concern:*

Be it known that I, LOUIS J. SCHMIDT, a citizen of the United States, and resident of Two Rivers, in the county of Manitowoc and State of Wisconsin, have invented certain new and useful Improvements in Stall-Guards for Animals; and I do hereby declare that the following is a full, clear, and exact description thereof.

The object of my invention is to provide a simple, economical and effective device attachable to the overhead stanchion or yoke-bar of an animal stall equipment for preventing the stabled cows from soiling their stalls, another object being to provide means for adjusting said device to accommodate animals of different sizes.

It is an established fact that when a cow is about to evacuate she moves forward in the stall and assumes a position with the head at an elevation and the back slightly bowed. To accommodate this shortened position of the animal the space between the head end of the stall and the dropping trough or gutter are ordinarily made quite short for the reason that the animal moves forward in the stall at such times. Thus the droppings will fall into said gutter, but by shortening the stalls as stated when the animal lies down its rump will overhang the trough or gutter, whereby its position of rest is rendered awkward and uncomfortable. Hence it is quite desirable to construct stalls for cows that are of normal length in order that they may lie comfortably therein and with my device this can be effected as the apparatus in question, when properly attached, will be suspended just clear of the back of the animal, at approximately the base of the neck, in such position as to compel the animal to move rearward in order to clear this obstacle, whereby it may assume its normal humped position for the purpose stated.

With the above objects in view the invention consists in certain peculiarities of construction and combination of parts as set forth hereinafter with reference to the accompanying drawings and subsequently claimed.

In the drawings Figure 1 represents a sectional elevation of an animal stall equipped with a guard embodying the features of my invention, the said guard being partly broken away and in section to more clearly illustrate its structural features and is shown in approximately the correct position it would assume with relation to the cow that is illustrated, the said cow being confined by a stanchion of any desired type, and Fig. 2, a detailed plan view of the stall guard with a portion of the stanchion or yoke-bar in connection therewith.

Referring by characters to the drawings 1 represents a yoke-bar to which is connected a stanchion 2 of any desired type, and 3 represents the floor of the stall provided with the usual rearwardly disposed trough or gutter 3', which gutter, as shown, is set back from the stall head a sufficient distance to permit the cow to easily recline without overhanging.

Mounted upon the yoke-bar 1 is a yoke, which yoke comprises a pair of arms 4 having socket-heads 4' that are fitted about the yoke-bar and secured thereto by clips 5, which are held to the arms by clamping bolts 5', whereby the said arms may be adjusted and securely held in such adjusted position. The outer ends of the arms carry looped straps 6, through which loops are fitted legs 7 that extend from a transversely disposed throat-bar 8, the same constituting a guard that is positioned just clear of the back of the animal as shown. The ends of the legs 7 engage straps 9, which are slidably mounted upon the arms 4 and when the legs are telescoped with relation to the arms, in order to bring the throat-bar in the desired position with relation to the back of the cow, these straps are secured by set-screws 9', which set-screws are in threaded union with the straps and adapted to impinge against the arms. Thus the arm members and throat member which comprise the yoke are rigidly locked together and the angle of this yoke can be adjusted about the yoke-bar by loosening the clamping bolts 5'.

From the foregoing description it is apparent that the animal is free to feed and recline without engaging the throat-bar of the guard, but should she assume a humped position for the purpose as stated heretofore, she will strike the bar 8 and be compelled to move backward in the stall so that her shoulders and neck are free and in this backward position the rump of the animal is brought into proper alinement with the gutter.

It is apparent that this guard can be adjusted to suit the various sizes of animals and when so adjusted it is securely held.

It should also be understood that while I have shown and described the yoke or guard as being formed from flat strap metal it is apparent that the same can be constructed from round iron or tubular sections without departing from the spirit of my invention.

I claim:

A stall guard comprising a yoke having a pair of arms provided with socketed heads adapted to be fitted about a yoke-bar, clips for securing said heads to the yoke-bar, a transversely disposed throat strap having legs in telescopic union with the arms, straps for securing the legs and arms in telescopic union, and set-screws carried by certain of the straps for locking the aforesaid arms and legs in their adjusted position.

In testimony that I claim the foregoing I have hereunto set my hand at Two Rivers in the county of Manitowoc and State of Wisconsin in the presence of two witnesses.

LOUIS J. SCHMIDT.

Witnesses:
LAWRENCE W. LEDVINA,
JOHN G. RUDIE.